United States Patent
Adamek et al.

(10) Patent No.: US 11,692,717 B2
(45) Date of Patent: Jul. 4, 2023

(54) HYDRONIC FLOOR HEATING SYSTEMS WITH FEATURES

(71) Applicant: Ademco Inc., Golden Valley, MN (US)

(72) Inventors: Martin Adamek, Pelhrimov (CZ); Leos Mrazek, Kladno (CZ); Jan Vomocil, Roznov pod Radhostem (CZ); Jiri Crhonek, Brno (CZ); Jan Vozenilek, Brno (CZ); Jiri Sapak, Brno (CZ); Oto Meran, Brno (CZ); Michal Sicner, Brno (CZ); Jaromir Cechak, Brno (CZ); Roman Cervinka, Brno (CZ); Daniel Becvar, Brno (CZ)

(73) Assignee: Ademco Inc., Golden Valley, MN (US)

( * ) Notice: Subject to any disclaimer, the term of this patent is extended or adjusted under 35 U.S.C. 154(b) by 192 days.

(21) Appl. No.: 17/178,105

(22) Filed: Feb. 17, 2021

(65) Prior Publication Data

US 2021/0172613 A1 Jun. 10, 2021

Related U.S. Application Data

(62) Division of application No. 16/150,053, filed on Oct. 2, 2018, now Pat. No. 10,989,419.

(60) Provisional application No. 62/567,159, filed on Oct. 2, 2017.

(51) Int. Cl.
| | |
|---|---|
| *F24D 13/02* | (2006.01) |
| *F24D 3/14* | (2006.01) |
| *E04C 2/52* | (2006.01) |
| *F24D 10/00* | (2022.01) |

(52) U.S. Cl.
CPC ............ *F24D 13/024* (2013.01); *E04C 2/525* (2013.01); *F24D 3/142* (2013.01); *F24D 10/003* (2013.01)

(58) Field of Classification Search
CPC ...... F24D 13/024; F24D 3/142; F24D 10/003; E04C 2/525; H04B 7/0606; H03M 3/332
See application file for complete search history.

(56) References Cited

U.S. PATENT DOCUMENTS

| | | | |
|---|---|---|---|
| 4,889,179 A | 12/1989 | Merenda | |
| 5,205,132 A * | 4/1993 | Fu ...................... | G01R 31/2891 236/78 B |
| 5,631,545 A | 5/1997 | Norman et al. | |
| 2009/0236433 A1 * | 9/2009 | Mueller ................. | F23N 5/203 236/51 |
| 2009/0287355 A1 | 11/2009 | Milder et al. | |
| 2009/0306828 A1 | 12/2009 | Larsen et al. | |
| 2017/0023429 A1 * | 1/2017 | Straeussnigg ......... | H03M 3/462 |

(Continued)

OTHER PUBLICATIONS

Prosecution History from U.S. Appl. No. 16/150,053, dated Apr. 24, 2019 through Jan. 22, 2021, 67 pp.

*Primary Examiner* — Marc E Norman
(74) *Attorney, Agent, or Firm* — Greenberg Traurig, LLP; Ryan D. Sharp; David J. Dykeman

(57) ABSTRACT

A hydronic floor heating system as it relates to an HVAC apparatus, approach and system. Aspects of the present system and approach may include a radiant floor optimization mode, low floor temperature in vacation mode, modifying a 300 Hz, or so, reading principle base on implementation of Pseudo-random jittering of a reading event improving short-term accuracy of the individual readings, and a combination of hardware and software filters for using thermal sensors with extended cable length.

16 Claims, 10 Drawing Sheets

(56) References Cited

U.S. PATENT DOCUMENTS

2018/0238565 A1  8/2018  Keber et al.
2020/0003431 A1  1/2020  Smith

* cited by examiner

HYDRONIC FLOOR HEATING SYSTEMS WITH FEATURES

This application is a divisional of U.S. application Ser. No. 16/150,053, FILED Oct. 2, 2018 and entitled, "HYDRONIC FLOOR HEATING SYSTEMES WITH FEATURES," which claims the benefit of U.S. Provisional Application No. 62/567,159, filed Oct. 2, 2017, entitled "Features of Hydronic Floor Heating Systems", the full disclosures of which are hereby incorporated by reference.

BACKGROUND

The present disclosure pertains to hydronic floor heating systems and particularly to energy efficiencies of such systems adaptable to a wide range of circuit configurations.

SUMMARY

The disclosure reveals a hydronic floor heating system as it relates to an HVAC apparatus, approach and system. Aspects of the present system and approach include a radiant floor optimization mode, low floor temperature in vacation mode, modifying the 300 Hz reading principle base on implementation of Pseudo-random jittering of a reading event improving short-term accuracy of the individual readings, and a combination of hardware and software filters for using thermal sensors with an extended cable length.

BRIEF DESCRIPTION OF THE DRAWING

The disclosure may be more completely understood in consideration of the following description of various illustrative versions of the disclosure in connection with the accompanying figures.

DESCRIPTION

Figure 1:
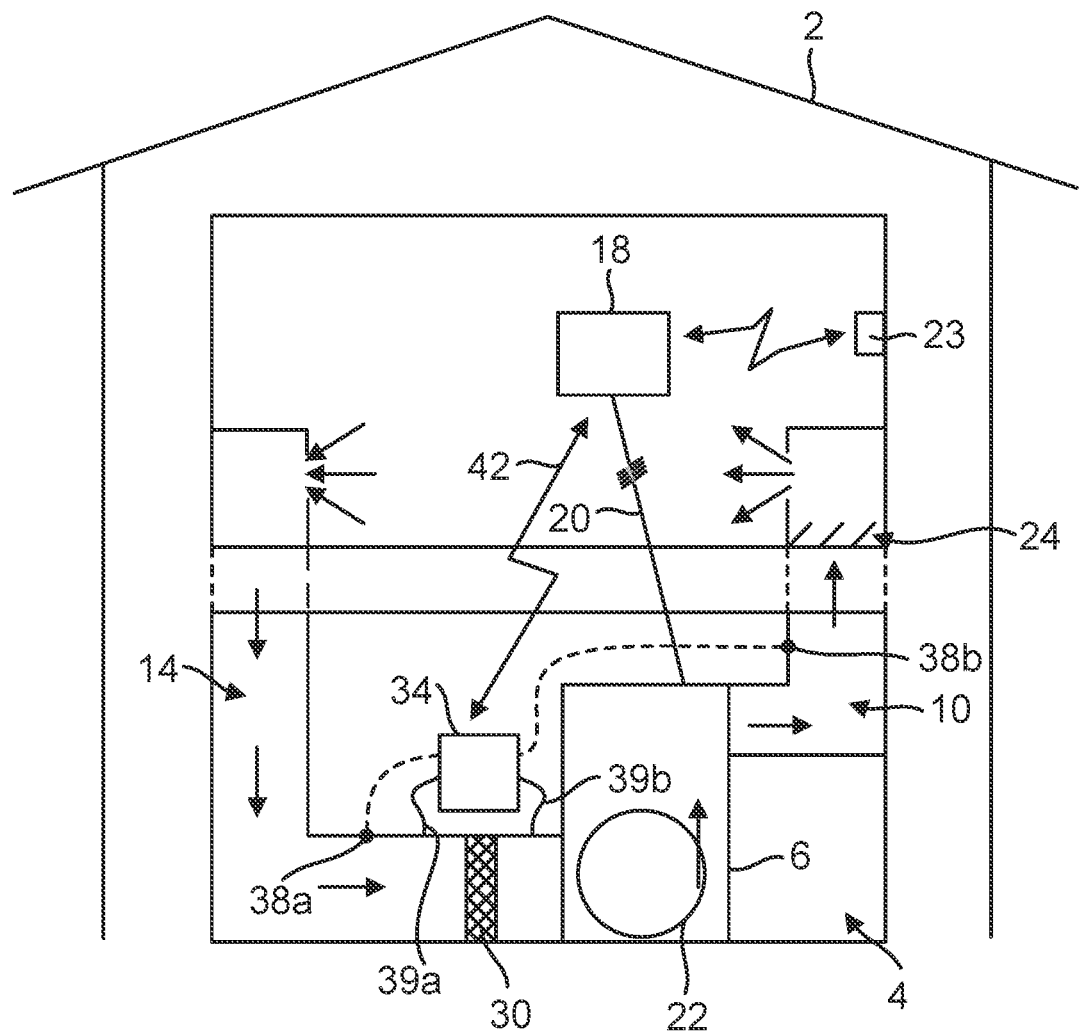
FIG. 1 is a schematic view of an illustrative HVAC system servicing a building or other structure.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The following description should be read with reference to the drawings wherein like reference numerals indicate like elements. The drawings, which are not necessarily to scale, are not intended to limit the scope of the disclosure. In some of the figures, elements not believed needed for an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "a version", "some versions", "other versions", and so forth, indicate that the version described may include a particular feature, structure, or characteristic, but every version may not necessarily include the particular feature, structure, or characteristic. Moreover, such phrases are not necessarily referring to the same version. Further, when a particular feature, structure, or characteristic is described in connection with a version, it is contemplated that the feature, structure, or characteristic may be applied to other versions whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein may be applied to building automation systems more generally.

For the purposes of providing an illustrative example, the various versions of the present disclosure are described in the context of an HVAC system. However, it is generally understood that many of the versions described herein may be utilized in connection with other building appliances and are not limited to use with an HVAC system.

Low Floor Temperature in a "Vacation" mode may be noted. Hydronic floor heating systems may allow setting a Low Floor Temperature Limit, which itself may appear difficult to understand, but can significantly affect thermal comfort and energy bills. To satisfy thermal comfort and keep the energy bills low, another specific Limit value should be set also for a vacation mode. Making the parameter configurable and having several of them (one per each schedule period plus a vacation mode) may confuse users as well as contractors as they may not necessarily understand its meaning. An incorrect value of the parameter may increase energy consumption, and on top of that it may significantly extend initial installation and create an opportunity for incorrect settings.

This feature may be unique in the hydronic floor heating market. It may keep the initial configuration very simple and quick. A user/contractor may have to configure only one single Low Floor Temperature limit and does not necessarily have to care about its settings and values in vacation mode, as it can be ignored to save energy bills. This may significantly improve user experience while reducing installation time.

One may implement a vacation mode in a way how a user understands it the most. Only an "away" setpoint may be maintained (either air or floor based on control mode). The Low floor temperature limit may be ignored since there is no need to satisfy comfort recovery to "occupied" periods (wake, return) while no one is home. Some contractors may use the Low Floor temperature limit as freeze protection, which is not necessarily needed in this case, because it is a separate feature, so again the limit is not necessarily needed for the mode.

Radiant floor optimization may be noted. To satisfy thermal comfort and keep energy bills low, the low floor temperature Limit value should change with temperature schedule. Making the low floor temperature Limit parameter configurable may confuse users as they may not understand its meaning. Having contractors to create week schedule for the parameter may difficult to understand and confuse contractors.

This feature appears unique in the hydronic floor heating market. It may need only a "Yes/No" answer from a user/contractor compared to forcing the user/contractor to understand the Low Floor Temperature Limit or forcing contractor to schedule the Low floor temperature limit parameter. This may significantly improve user experience while reducing installation time.

An optimization feature may be created, which when enabled, can ignore the Low floor Temperature Limit during "unoccupied" periods (i.e., Away, Sleep), which can prevent rooms from overheating as well limit use of heating equipment, which can reduce energy bills. Thermal comfort may be satisfied as users do not touch/walk the floors during the unoccupied periods. From a user's perspective there may be an ISU or user menu item which is called "Economy mode" (or a similar name) and provide options "Yes/No". A "Yes" option may ignore the Low Floor Temperature Limit during the occupied periods. The "No" option may maintain the Low Floor Temperature Limit when any period is active.

The present approach may have a software component. A stack level such as a sensor may be a hardware device with some embedded software for measuring/detecting and transmitting data (e.g., temperature, pressure, motion, and the like). The embedded software may run in a device/unit (e.g., firmware).

A combination of hardware and software filters for using thermal sensors with extended cable length may be noted. Connecting of external temperature sensors to a thermostat may be influenced by various kinds of interferences. A main source of interference may be AC supply lines. Due to a possible transmission of interference from AC lines to sensor cables, the lengths of the cables may be limited. With a use of a hardware filter in combination with a special software measuring algorithm, the lengths of the cables may be increased up to 100 meters. A current situation is that thermostats do not necessarily use cables longer than 5 meters or their measurements may be inaccurate.

Many installations of external temperature sensors may be limited by cable length. Current installations often use cables up to 5 meters long. Longer cables are not necessarily recommended; instead, special and expensive shielded cables should be used. A benefit of this solution may be a use of a sensor with a cheap connection cable and a functionality that is the same as an expensive shielded cable. The result may be higher performance with low cost components. This may have a direct impact on customers, who may get a better product for a lower better price.

The present mechanism may have two parts—hardware (HW) and software (SW). The hardware part may contain a sensor connected to thermostat terminals and a measuring circuit on a thermostat PCB (e.g., a print circuit board). The measuring circuit may contain a capacitive low pass filter which filters out interference at higher frequencies. The software part may contain a 300 Hz sampling process that ensures a filtering of 50 Hz and 60 Hz AC line interference. Other frequencies may be incorporated. The software filtering may also contain pseudo random jittering, which ensures cancellation of static reading errors which could occur in special cases as an interference product of a line voltage frequency deviation and a reading interval rate. Altogether, this arrangement may be a robust filter. The arrangement may be used in common installations where an extended cable appears to be needed or where high interference can be expected, such as, for example, measuring temperatures in different rooms, measuring outdoor temperatures, or a routing of sensor cables close to AC lines.

The software component may have a stack level that is a sensor incorporating a hardware device with some embedded software for measuring/detecting and transmitting data (e.g., temperature, pressure, motion, and/or so on). A software type may involve embedded software running in a device/unit (e.g., firmware).

Modification of the 300 Hz reading principle based on implementation of pseudo-random jittering of a reading event improving short-term accuracy of the individual readings may be noted. The room thermostats may read a temperature from an external sensor (thermistor) wired to the thermostat. Because the wires do not necessarily have to be shielded, then the noise at a corresponding A/D converter's input may be relatively strong; and when the sensor's cable is located close a line voltage distribution, the noise may contain a significant 50 Hz or 60 Hz component. Such specific components may make it possible to attenuate if a so-called 300 Hz reading principle is used (one reading consists of 30 samples captured during 96.7 ms). Other numbers or numerical values may be used. If the line voltage frequency is shifted from an ideal value, then the individual readings of temperature (consisting of 30 samples) may start to oscillate around the real value. The frequency of the oscillations may equal the line voltage frequency to reading a frequency difference. Normally, these oscillations may be eliminated by utilizing a moving average or another filtering principle, because a mean of the oscillations may correspond with the real value. An issue may occur when the frequency difference is negligible and therefore the oscillations have a very low frequency (one period per hour, for instance). The problem may periodically occur at, for instance, 51.0, 52.0, 53.0 Hz, and so on, if the reading interval is 1 second. This very low frequency product (a so-called beat) may cause a short term remaining reading shift which might be interpreted like a temperature change because the filtration cannot reject so low frequencies without affecting response time of the thermostat to a real temperature change.

If the reading period is still exactly 1/300 Hz but the individual readings are randomly phase swept with (some readings are earlier, some later, but on the whole its count is 300 per second), and the amplitude of the phase jittering range is at least +/−20 ms, then very undesired very low frequency products may be broken and the reading error may have now a pseudo-random character around the real temperature and the long time remaining reading shifts cannot necessarily occur.

The reading interval may be one or more second (typically, 20 second) period and the individual readings may have to be spread around the nominal times. The spread interval should be at least +/−1/50 Hz=+/−20 ms, and the samples should be spread randomly in the interval. A pseudo-random function may be used for this purpose. The 300 Hz filtration principle with readings of the pseudorandom jitter, may be advisably combined with suitable hardware pre-filtration which attenuates noise at higher frequencies. The approach and system may have a software component. There may be a stack level sensor that can be a hardware device with some embedded software measuring, detecting and transmitting data (e.g., temperature, pressure, motion). The software type may be embedded, such as software that runs in a device/unit (e.g., firmware).

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 may include one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller or controllers 18 may be configured to control the comfort level in the building or structure by activating and deactivating the HVAC component or controllers 6 in a controlled manner. The HVAC controller or controllers 18 may be configured to control the HVAC component or components 6 via a wired or wireless communication link 20. In some cases, the HVAC controller or controllers 18 may be a thermostat, such as, for example, a wall mountable thermostat, but this is not necessarily needed in all versions. Such a thermostat may include (e.g., within the thermostat housing 200, FIG. 6B) or have access to one or more temperature sensors for sensing ambient temperature at or near the thermostat. In some instances, the HVAC controller or controllers 18 may be a zone controller, or may include multiple zone controllers each monitoring and/or controlling the comfort level within a particular zone in the building or other structure.

In the illustrative HVAC system 4 shown in FIG. 1, the HVAC component or components 6 may provide heated air (and/or cooled air) via the ductwork throughout the building 2. As illustrated, the HVAC component or components 6 may be in fluid communication with every room and/or zone in the building 2 via the ductwork 10 and 14, but this is not necessarily needed. In operation, when a heat call signal is provided by the HVAC controller or controllers 18, an HVAC component 6 (e.g., forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g., forced warm air furnace) for heating via return air ducts 14. Similarly, when a cool call signal is provided by the HVAC controller or controllers 18, an HVAC component 6 (e.g., air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g., air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not necessarily needed. For example, one or more dampers 24 may be coupled to one or more HVAC controllers 18, and can be coordinated with the operation of one or more HVAC components 6. The one or more HVAC controllers 18 may actuate dampers 24 to an open position, a closed position, and/or a partially open position to modulate the flow of air from the one or more HVAC components 6 to an appropriate room and/or zone in the building or other structure. The dampers 24 may be particularly useful in zoned HVAC systems, and may be used to control which zone or zones receive conditioned air from the HVAC component or components 6.

In many instances, one or more air filters 30 may be used to remove dust and other pollutants from the air inside the building 2. In the illustrative example shown in FIG. 1, the air filter or filters 30 are installed in the return air duct 14, and may filter the air prior to the air entering the HVAC component 6, but it is contemplated that any other suitable location for the air filter or filters 30 may be used. The presence of the air filter or filters 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC components 6 under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g., delta T=discharge air temperature−return air temperature).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g., temperature, pressure, flow rate, and so forth) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Radiant Floor Optimization and Vacation Mode may be noted. HVAC controller 18 may display a home screen 120 on the display 86 (FIG. 4A), which shows the time 122, current temperature 124, a fan status 126, an HVAC system status 128, a back button 130 represented by "−", a Mode button 132, a Menu button 134, a Fan button 136, and a forward button 138 represented by "+". From the home screen 120, a user may begin by selecting the Menu button 134 at the same time as the forward button 138 in order enter an installer setup screen 140 (see FIG. 4B). In some cases, needing a selection of two or more buttons simultaneously may help prevent a homeowner from inadvertently entering the installer setup screen.

Mode button 132 allows the user to select system mode of "Heat" or "Off". Menu button 134 may be pressed to display options. This is typically where a user starts to set a program schedule. Further, the display 86 will wake up by pressing any of the five buttons. The display 86 screen may be lit for up to 45 seconds, or other duration, after the user completes changes. Optionally, the user may set the thermostat 18 to keep the display 86 light always on.

A user may be an installer, an HVAC professional, and/or service provider.

The programmable thermostat 18 may be powered by a C wire, alkaline battery or other power means. Batteries are optional and may provide backup power but the thermostat 18 is wired to run on AC power.

Similarly, the display 86 may have a plurality of different screens. Each screen may have areas that display various information such as icons, graphics, numbers, and letters as needed to accomplish operation in accordance with the present system and approach. The display 86 button may also be a touchscreen to receive user input.

Figure 4A:
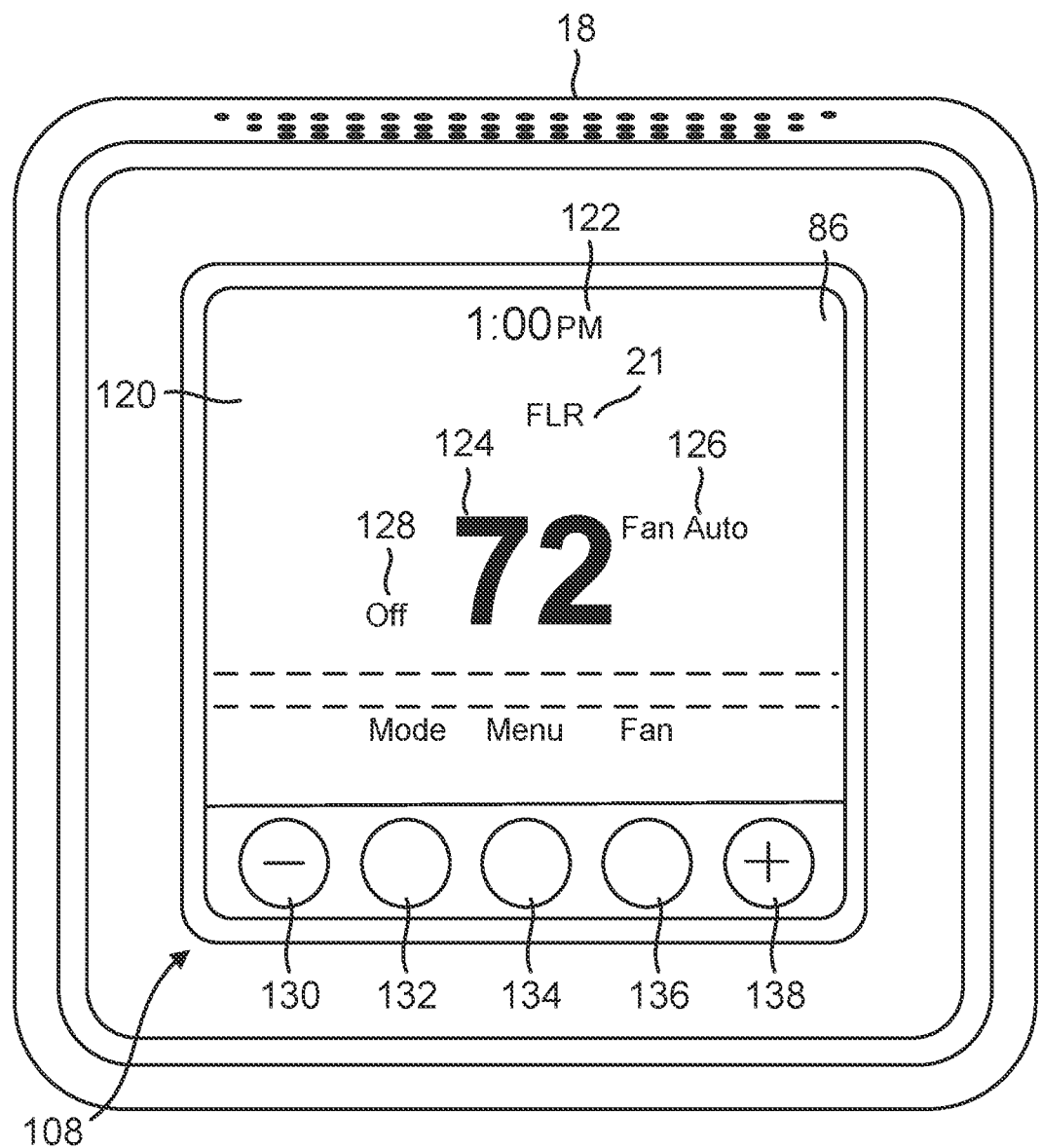
FIGS. 4A-4B are schematic views of illustrative screens of an HVAC controller showing an approach for initiating an HVAC controller to encode settings and/or data on the user interface of the HVAC controller.

The display 86 may further include system status 18 information to indicate when the thermostat is in "Heat On" or "Recovery" mode. Schedule information 14 may inform the user when the system is following time based schedule by displaying the phrase "Following Schedule" at 128 (FIG. 4A). A digital clock may be shown to display the actual time at 122.

Schedules can be in the thermostat 18, in home controlling lights or such, or in the cloud controlling multiple devices in multiple locations.

As discussed above, the HVAC controller 18 may communicate with the one or more HVAC components 6 via a wired or wireless link 20. The HVAC controller 18 in FIG. 2 may be a connected HVAC controller 18 that is connectable to a network, or may be an non-connected HVAC controller 18 that may not be capable of connecting to a network (other than the wired or wireless link 20 to one or more HVAC components 6 of the HVAC system 4).

It is envisioned that the floor temperature may be measured from heating elements 40 creating a grid under the entire floor area. The heating elements 40 may be electric cables, heating panels, hot water tubing and the like as is well known in the art. The floor temperature sensor 32 may also be embedded in the floor area. The heating elements 40 and floor temperature sensor 32 may be in communication with a controller 18 within the thermostat. The controller 18 may also be in communication with the room ambient temperature sensor 43 and external sensor 12. The controller 18 also is able to communicate with various networks such as a local network and the Internet via wired or wireless devices.

Figure 3:
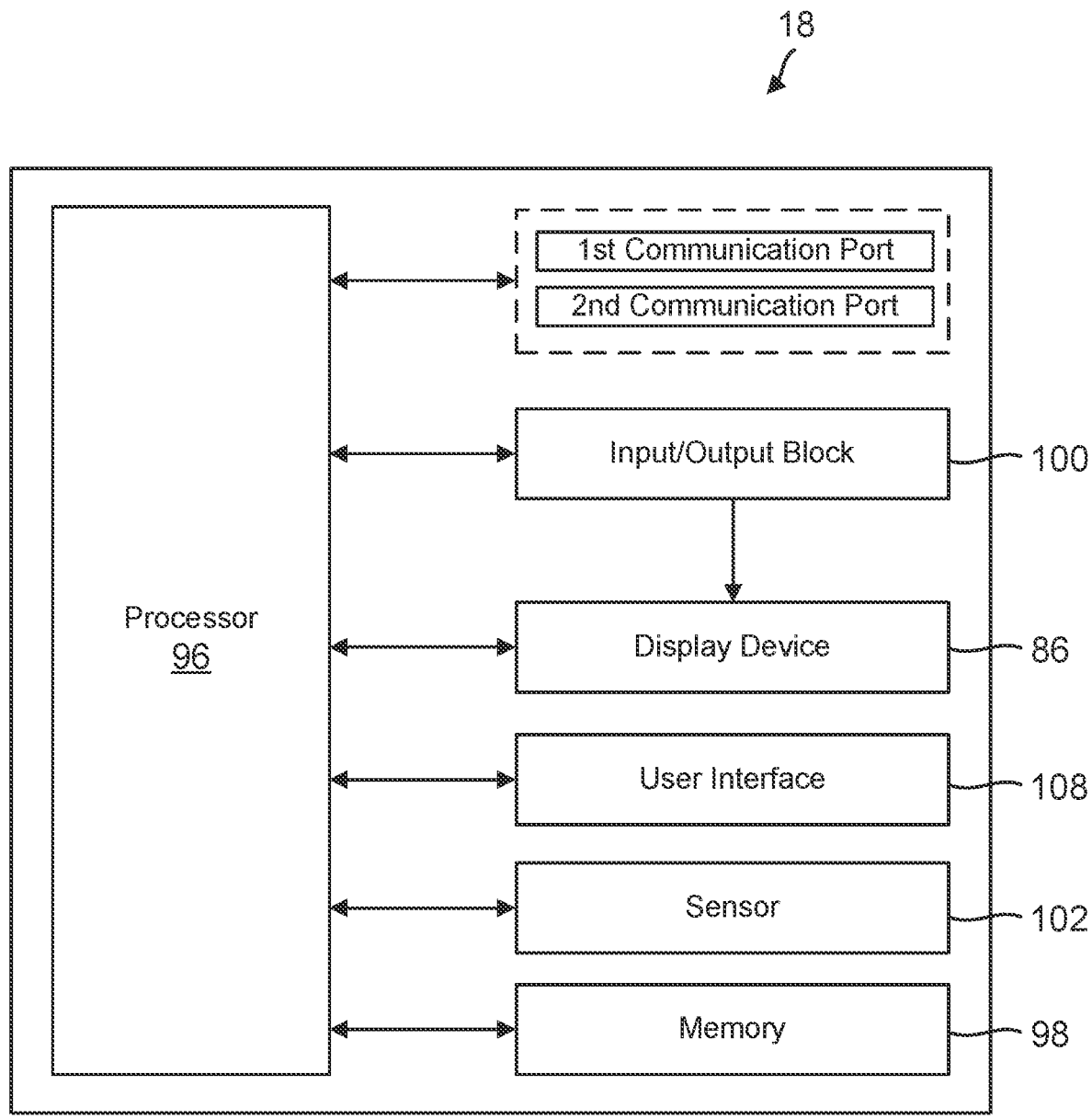
FIG. 3 is a schematic view of an illustrative HVAC control system that may facilitate access and/or control of the HVAC system of FIG. 1.

Referring to FIG. 3, In many cases, the HVAC controller 18 may include an input/output block (I/O block) 100 for providing one or more control signals to the HVAC system 4. For example, the I/O block 100 may communicate with one or more HVAC components 6 of the HVAC system 4. The HVAC controller 18 may have any number of wire terminals for receiving control wires for one or more HVAC components 6 of the HVAC system 4. Different HVAC systems 4 may have different HVAC components and/or type of HVAC components 6, which may result in different wiring configurations. In some cases, the I/O block 100 may communicate with another controller, which is in communication with one or more HVAC components 6 of the HVAC system 4, such as a zone control panel in a zoned HVAC system, equipment interface module (EIM) (e.g., EIM 34 shown in FIG. 1) or any other suitable building control device.

The HVAC controller 18 may also include one or more sensors 102 such as for example, a temperature sensor, a humidity sensor, an occupancy sensor, a proximity sensor, and/or the like. In some cases, the sensor or sensors 102 of the HVAC controller 18 may include an internal temperature sensor, but this is not necessarily needed. Alternatively, or in addition, the HVAC controller 18 may communicate with one or more remote temperature sensors, humidity sensors, occupancy sensors, and/or other sensors located throughout the building or structure. Additionally, the HVAC controller may communicate with a temperature sensor, humidity sensor, and/or other sensors located outside of the building or structure for sensing an outdoor temperature and/or humidity if desired.

The user interface 108 (FIG. 4A), when provided, may be any suitable user interface that permits the HVAC controller 18 to display and/or solicit information, as well as accept one or more user interactions with the HVAC controller 18. For example, the user interface 108 may permit a user to locally enter data such as temperature set points, humidity set points, fan set points, starting times, ending times, schedule times, diagnostic limits, configuration settings, responses to alerts, and the like. In one version, the user interface 108 may be a physical user interface that is accessible at the HVAC controller 18, and may include a display 86 and/or a distinct keypad. The display 86 may be any suitable display. In some instances, a display may include or may be a liquid crystal display (LCD), and in some cases an e-ink display, fixed segment display, or a dot matrix LCD display. In one example, where the display 86 may be a fixed segment display, the fixed segment display may include a plurality of fixed segments at fixed locations that form characters, icons, and/or menu items to interact with a user of the HVAC controller 18 and/or provide information to a user of the HVAC controller 18. Alternatively or in addition, the user interface 108 may be a touch screen LCD panel or other touch sensitive screen that functions as both display and keypad. The touch screen LCD panel may be adapted to solicit values for a number of operating parameters and/or to receive such values, but this is not necessarily needed. In still other cases, the user interface 108 may be a dynamic graphical user interface.

A hydronic floor heating system may incorporate one or more thermostats 18. Each thermostat 18 may include a controller 18 that integrates an external temperature sensor measuring circuit 37 (FIG. 2) having an external temperature sensor 12, with a floor temperature sensor 32 and a room ambient temperature sensor 43 provided for each thermostat 18, and whose temperature readings are fed to a processor 96 to control the floor temperature of an underfloor heating system in one or more rooms or areas of a building. The processor 96 can include, without limitation, a central processing unit, an arithmetic logic unit, an application specific integrated circuit, a task engine, Wi-Fi module, and/or any combinations, arrangements, or multiples thereof not explicitly shown. The processor 96 may also be in communication with a memory 98, such as random access memory (RAM), rewritable flash memory, read only memory (ROM). The memory 98 may include software to perform the functions of the present system and approach and may be a combination of integral and external components.

The external temperature sensor measuring circuit 37 may incorporate components for receiving, processing, displaying and/or transmitting digital and/or analog data. The external temperature sensor measuring circuit 37 may also be included within the controller. Various other circuitry may also be included as needed for proper operation. The controller 35 may include A/D conversion circuitry, an integral display driver, various connection ports and the like.

Each thermostat 18 may have dual sensor ability to control both the room temperature and the floor temperature. Each thermostat 18 may also operate with room ambient sensor 43 only or floor sensor 32 only. The floor temperature is monitored to ensure that the floor temperature does not exceed regulatory limits. Should the floor temperature reach the maximum regulatory limits, heating of the floor will cease until the temperature has lowered again.

The external air sensor 12 signals the outside temperature to the individual room thermostat or thermostats 18. The maximum floor temperature of each room may be altered depending on the external temperature. The reading from the external air temperature sensor 12 may be processed and a digital or analogue signal will convey the outside temperature information to any number of individual room thermostats.

The programmable thermostat 18 can be set to operate in one of 3 different control modes. These settings may determine which temperature is measured, controlled and displayed on the thermostat home screen display 86.

Figure 4B:
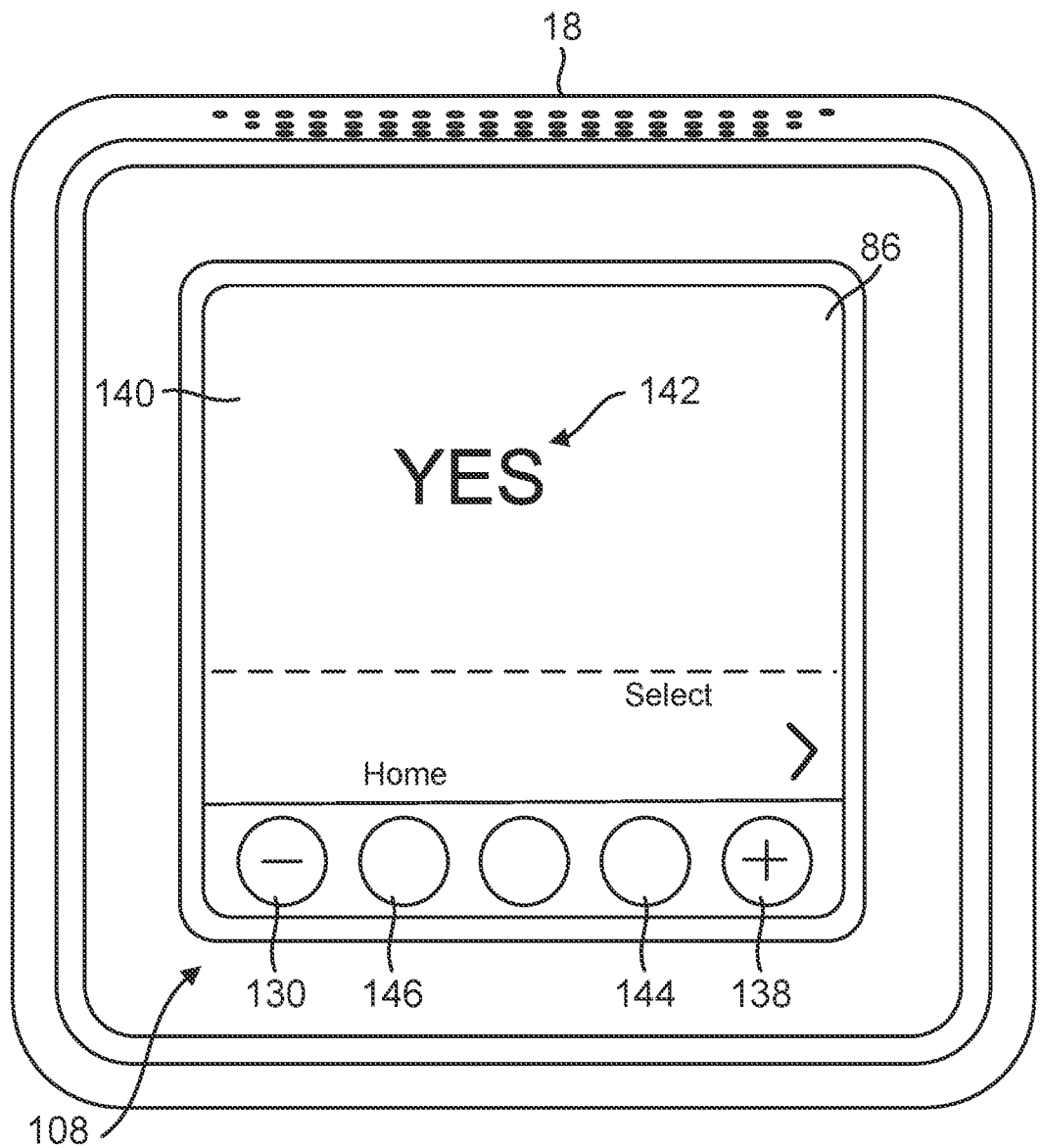

Referring to FIGS. 4A-4B, a program schedule may store an instruction to allow the user to program operation of the controller. In the economy mode of operation, the floor heating system does not maintain a low floor temperature when the room is unoccupied, and upon ending the economy mode a low floor temperature may be maintained in the floor heating system irrespective of the occupancy state of the room. The display 86 of the hydronic floor heating system may provide a Yes/No option to the user to select the economy mode.

"A" mode may describes air temperature only. When selecting "A" mode, it may control and display the ambient or room air temperature only. "F" mode may control the floor temperature only. When selecting "F" mode, it may control and display the floor temperature only using an external floor temperature sensor 12. This control mode typically may be used in areas such as bathrooms where floor temperature could be scheduled to be warm only during occupied morning and evening periods. Actual floor temperature may be indicated by "FLR" text at the indoor temperature setpoint 21 (FIG. 4A) above the actual floor temperature value 124. Likewise, actual ambient air temperature could also be displayed in the display 86.

"AF" mode describes both Air and Floor temperatures. AF mode may control and display the ambient air temperatures as well as maintain the floor temperature within desired floor temperature limits using an external floor temperature sensor 12. Setting the minimum and maximum floor temperature limits may be done by a user as a way of enhancing the comfort and protecting the floor covering at the same time. In "AF" mode, minimum floor temperature limit may override the air temperature. Actual floor temperature may also be displayed on the thermostat by pressing MENU/TEMP.

If the thermostat 18 is configured to operate in "AF" mode and the program schedule is followed, a user may disable the preset minimum floor temperature limits. Disabling the minimum floor temperature limit can reduce energy bills during times when comfort is not necessarily needed (Away and Sleep periods). The floor covering and system remains protected as the thermostat 18 keeps controlling maximum floor temperature limit and minimum freeze protection temperature all the time.

Recommended maximum floor temperature may be 90° F. (32° C.) for most floor covering types. An example maximum floor temperature for wood floor may be 85° F. (29.5° C.). Freeze protection temperature for garages and basements may be set between 41-45° F. (5-7.2° C.).

An example installer setup screen 140 is depicted in FIG. 4B, which shows a menu item indicator 142 that, in this case depicts Low Floor Mode Setup 142, a back button 130, a forward button 138, a select button 144, and a home button 146. One may scroll to menu items other than "ISU" by selecting the forward button 138. Once a desired menu item is displayed (e.g., the installer Set Up (ISU) in this case) at the menu item indicator 142, the user may select the designed menu by selecting the forward button 138 simultaneously with the select button 144, or in some cases, just the select button 144.

Program schedule may also be programmable to allow the user to select Yes or No when presented with the option of setting the lower temperature limit.

Further, Economy (ECO) mode may also be utilized only if thermostat 18 is configured for AF control mode and is disabled (OFF) by default. Once in ECO mode, a user may be provided a Yes/No option to ignore low floor temperature limits set during the period. When the user selects Yes, the system may ignore low floor temperature limit during this period. If the user selects No, the system may maintain the low floor limit previously set. With adaptive intelligent recovery (AIR), the thermostat 18 may learn how long it takes the system to reach the temperature that one wants. It may then turn on the heating system earlier to make sure the user is comfortable at the time expected. AIR is a comfort setting. Heating or cooling equipment may turn on earlier, ensuring the indoor temperature will match the setpoint at the schedule time.

That is, the ambient room temperature sensor 43 may predict a future occupancy level based on measured occupancy data and store this data in the memory 98 as a user's choice. The processor 96 may contain an analysis and prediction software program for analyzing and interpreting the data inputs, such as to develop a measure of building performance. In addition, the processor 96 may contain software program for forming predictive models, such as predicting future occupancy of the room or building and/or predicting indoor conditions. This data may then be used to operate the thermostat 18.

Alternatively, if the room will be unoccupied for a set amount of time, temperature (for example 75° F.) may be set as a control target temperature and the sensor circuit 37 will perform a control which maintains this temperature. After selecting the menu button 134, the user will be able to select TEMP to let the low floor temperature. Once the user presses buttons 130, 138 to the desired low temperature, the screen may display "Yes" or "No" repeatedly for a set period of time until the user presses the select button (FIG. 4B) to denote acceptance or disapproval, respectively.

A user may also configure one single low floor temperature limit in vacation mode to affect thermal comfort and lower energy bills. Vacation mode overrides the current program schedule for a longer period of time. One may use this feature when being away for an extended period of time. Once a user presses the button Menu 17 on the thermostat 18, temperature/navigation buttons 20 can be used to select button "VACA". The days number may start to blink and the user will continue to set the number of days for the new temperature setpoint to override the program schedule. Once a user presses the select button, the temperature setpoint starts blinking. Pressing temperature/navigation buttons 20 further allows the user to adjust the temperature setpoint for the number of selected days. Pressing select button once more, further activates the vacation schedule and restores to the thermostat home screen.

The activation vacation schedule is indicated via VACA above the actual temperature 124 on the display 86. After the vacation period ends, the thermostat 18 may follow the regular program schedule.

Figure 5A:
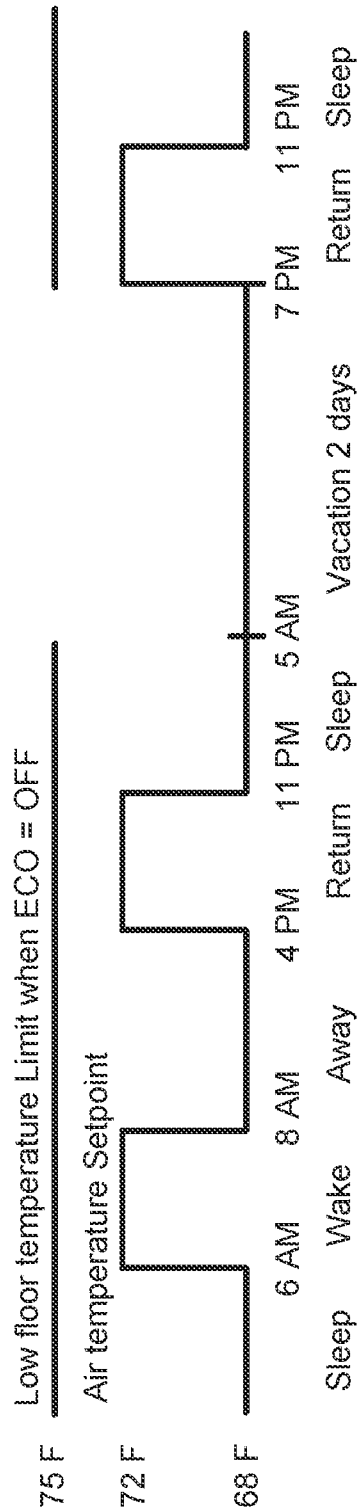
FIGS. 5A-5B are graphical charts of the vacation mode set to OFF/ON in accordance with the subject disclosure.
Figure 5B:
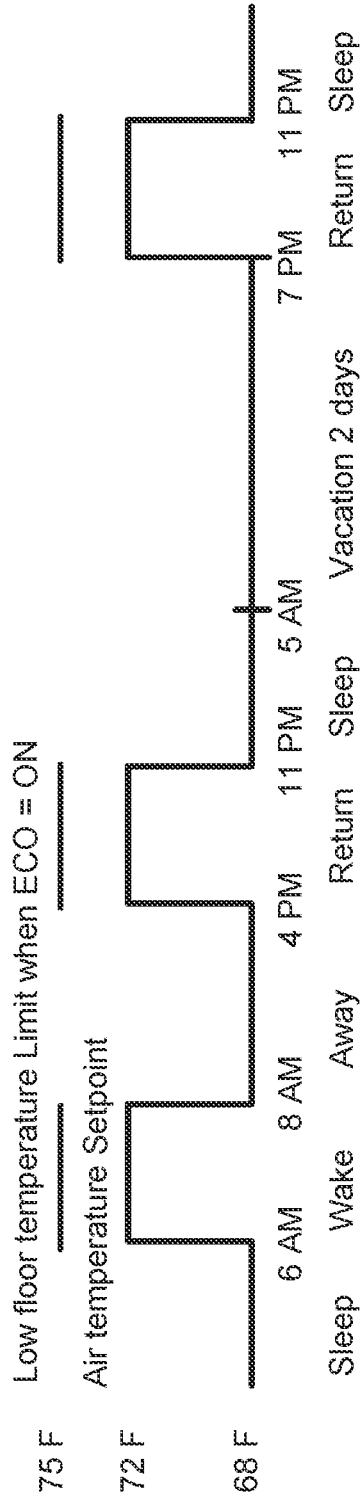

FIG. 5A, illustrates a regular day schedule when ECO is OFF and the lower floor temperature limit is set to 75° F. As shown, the temperature remains at 75° F. during Sleep, Wake Away and Return modes. FIG. 5B, illustrates the effect of a regular day schedule including vacation mode. The effect of ECO being ON as compared to the actual low floor temperature limit value of 75° F. for each plot. The low floor temperature limit remains at 75° F. during Wake and Return modes.

Figure 6A:
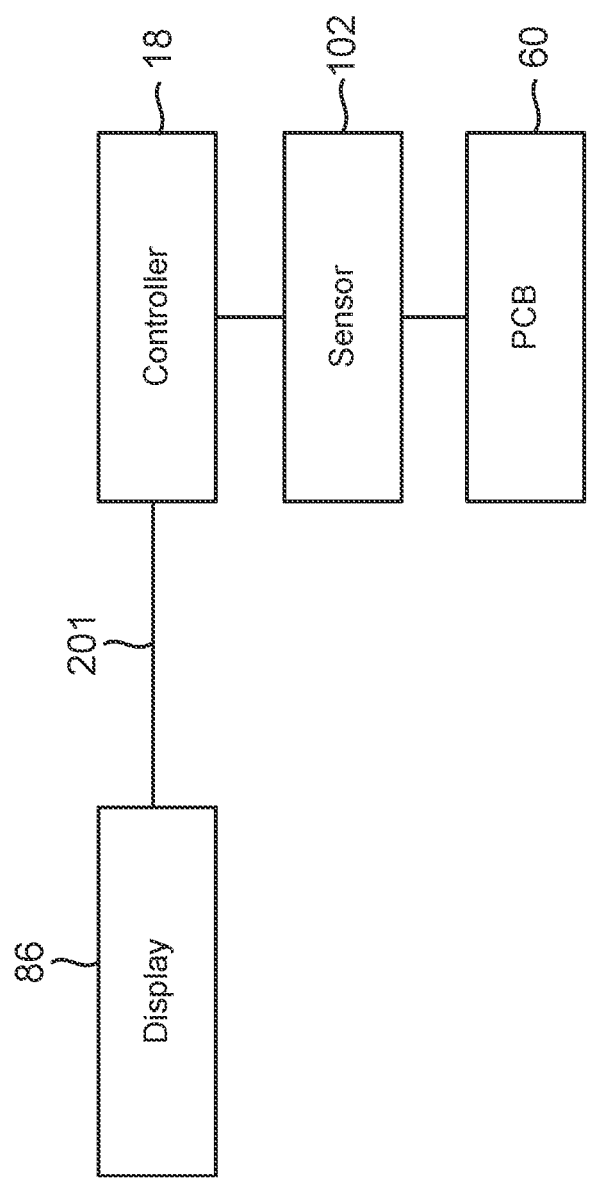
FIGS. 6A-6B are schematic views of an illustrative approach of utilizing extended cable in accordance with extended cable length.
Figure 6B:
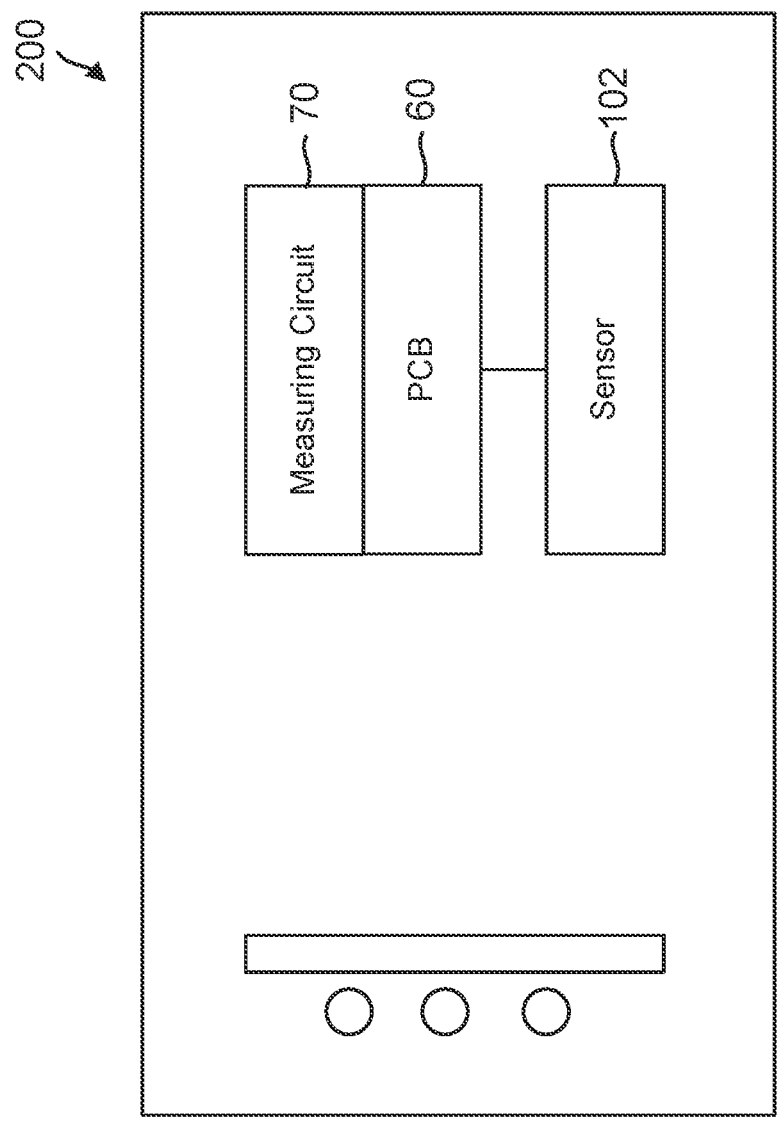

Hardware and software filters with extended cable length may be noted. Referring to FIGS. 6A-6B, in another version, the housing 200 of the HVAC controller 18 may be configured to house the display 86, the printed circuit board (PCB) 60, measuring circuit 70, thermostat terminals, and the temperature sensor 102. Specifically, whilst a temperature sensor 102 attached to a printed circuit board 60 is dimensionally very stable it is in close proximity to the circuit board and heat generating components on the circuit board, and thus may not give a reliable reading, or more particularly a reliable reading of ambient temperature outside the HVAC controller 18. Whereas a temperature sensor 102 connected to an extended cable 201 may be spaced from the circuit board 60 and heat generating components on the circuit board 60, and may be positioned adjacent an outer wall of the housing 200 of the HVAC controller and/or adjacent a vent 10 in the outer wall (FIG. 1).

External temperature sensor measuring circuit 70 may contain capacitive low pass filter which may filtrate interference at higher frequencies. Usage of extended cable 201 may connect to sensor 102. When utilized with a floor heating system, shorter cables are harder to utilize. If the extended cable 201 is utilized with an outdoor/external sensor, the outdoor sensor can be put anywhere as distance would be not an issue. The present system and approach may avoid shorter (up to 5 meters) shielded cable lines.

A printed circuit board (PCB) thermal model may incorporate dissipated power from other electronic components such as a TRIAC, thermal resistance of power traces, a position of a compensation sensor, and ambient sensor thermal cooling and position.

In some cases, the cable 201 may extend from, for example, the display 86 or other component of the HVAC controller 18 along the interior surface of the housing 200, and connect to a connector on the printed circuit board. In some cases, the interior surface of the housing 200 may have features that interact with the cable to help position the temperature sensor at a desired location within the housing 200, and to give the cable 201 additional support. The temperature sensor 102 may be mounted on the cable 201 and connected to the printed circuit board 60. The temperature sensor 102 may be facing and/or positioned adjacent a lower part of the interior surface of the housing 200. When so provided, heat generated by electrical components within the housing 200 may tend to rise away from temperature sensor 102, thereby having less influence on the sensed temperature.

In some cases, ambient air may be drawn in through the lower side of the housing 200 through a vent or the like by thermal convection caused by the heat generating components of the printed circuit board 60, and exit at the top side of the housing 200. The temperature sensor 102 may be positioned near the lower side of the housing 200 and in the flow of air, which may represent the ambient air temperature outside of the housing 200.

For a given PCB 60 with metal traces or conductors carrying electrical power and data, appropriate slots can be milled into the PCB 60 to depths corresponding to the thickness of the connectors (not shown). The connectors can then be snugly placed into those slots by hammering them into the slots or with some other means of applying appropriate pressure. Glue may also be used to secure the connectors in those slots if needed. The next step would be to solder the connectors to the metal traces on the PCB for connecting them to power or signal lines on the PCB.

In some cases, external temperature sensor measuring circuit 70 may be provided on PCB 60 to assist in protecting against electromagnetic interference (EMI), signal noise, and/or Electro-static discharge (ESD). The PCB 60 may be a multiple layer printed circuit board that includes a layer that is substantially a metal layer (e.g., a ground layer). The metal layer may span across a proton of the PCB 60 and may provide a shied around sensor unit. The PCB 60 may include one or more filter components, where the one or more filter components may be electrically couples to at least one of the one or more terminals of the PCB 60. The filter components may include, for examples, one or more inductors, capacitors, filter capacitors, ESD diodes and/or any other components suitable for preventing or mitigating incoming and outgoing noise. Such filter components may be utilized to filter poor signals (e.g., power and ground), output signals, and/or any other signals. The first side of the PCB may support a ground terminal, a power terminal, and one or more sensor output terminals on or near a sensor 102.

Figure 2:
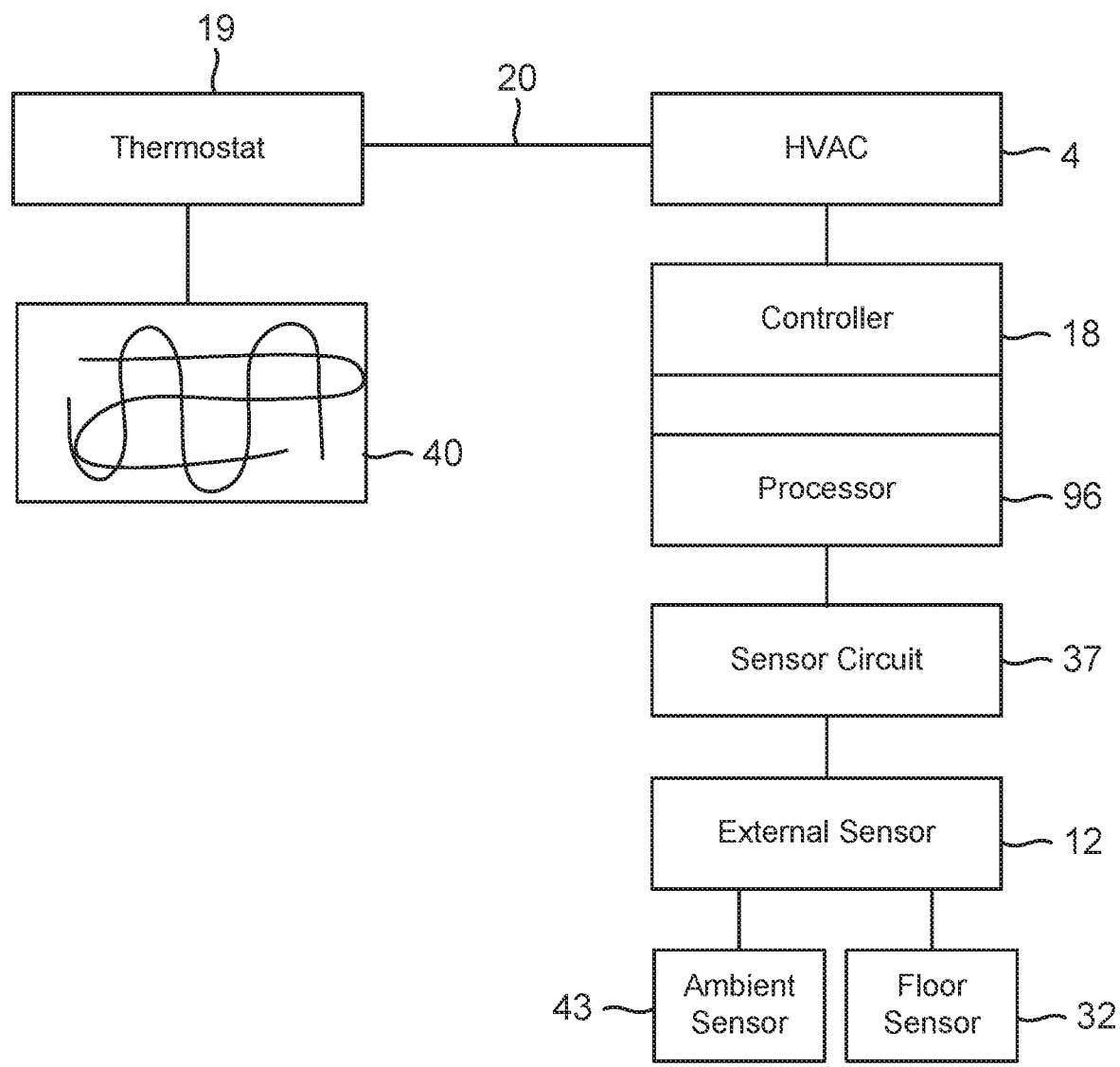
FIG. 2 is a schematic view of an illustrative HVAC controller that may facilitate access and/or control of the HVAC system of FIG. 1.
Figure 7A:
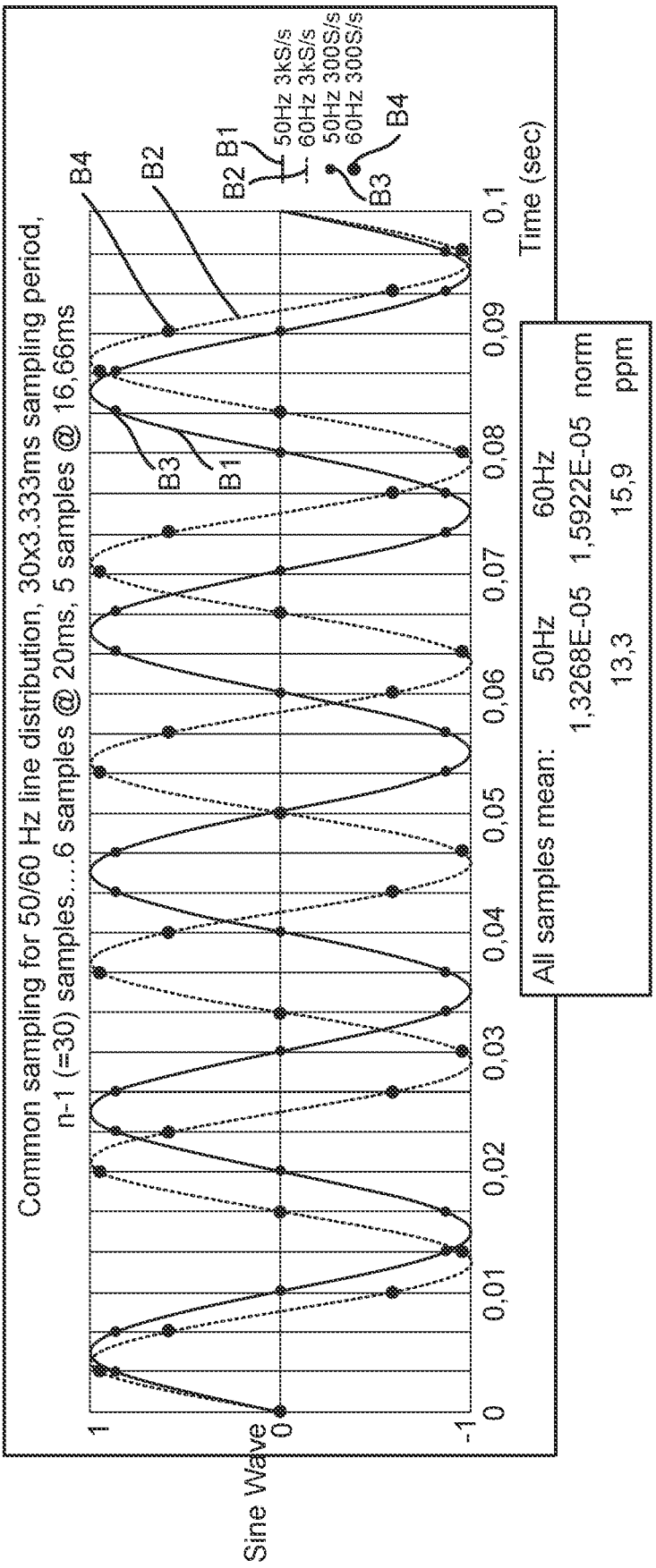
FIGS. 7A-7B are graphical representation of implementing a pseudo random jittering of a reading event in accordance with the subject disclosure.
Figure 7B:
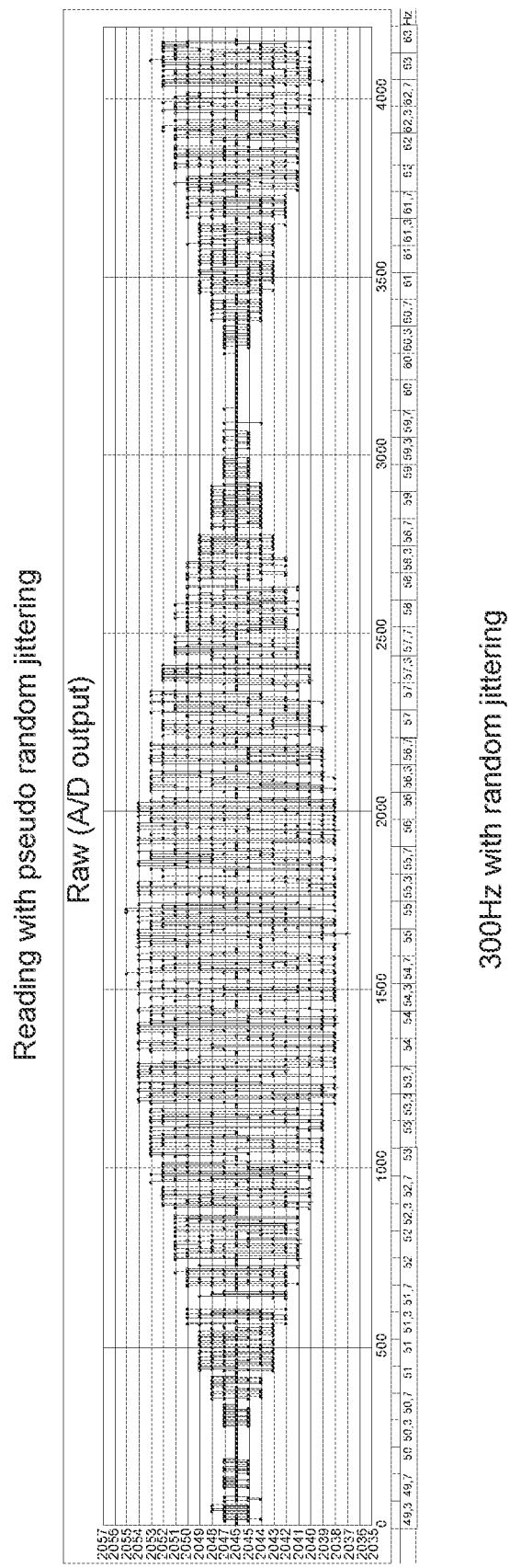

FIG. 7B, shows the present approach having readings with pseudo random jittering. Modifying 300 Hz (or other frequency) reading principle Jittering may be noted. In another version, the techniques herein allow for reading operations to be adjusted based on external temperature sensor 12 data available to a device regarding one or more individual temperature readings. The correlation between the sensor data and the individual reading of temperature may be modeled. In a further aspect, one or more parameters may be adjusted based on the conditions provided by the model. In yet another aspect, a supervisory device may receive sensor data from one or more other devices and initiate a network operation change by providing instructions to the one or more other devices based on the sensor data. The techniques described herein may be performed by hardware, software, and/or firmware, which may include computer executable instructions executed by the processor 96 (FIG. 2).

Sensor data may include any readings regarding the physical conditions external to network. For example, sensor data may be generated or derived from readings taken by a temperature sensor, a sound sensor, a barometer, a humidity sensor, or the like.

Referring now to FIG. 7A, a 300 Hz Principle is shown. This principle shown is generally known of rejecting 50 Hz or 60 Hz noises. Each reading consists of 30 samples captured during 96.7 ms. The average value of the captured samples is theoretically equal to zero. B1 sine wave denotes 50 Hz at 3 kS/s. B2 sine wave denotes 60 Hz at 3 kS/s. B3 is the sample of one 50 Hz at 300 S/s. B4 is a sample of one 60 Hz at 300 S/s. As shown, 6 samples are at one 50 Hz period and 5 samples at one 60 Hz period.

A present approach may be a way to lengthen wires of a temperature sensor which is connected to thermostat. A goal may be achieved by a combination of both hardware (HW) and software (SW) filtering. Both filtering approaches may be combined.

An HW filter may be a simple filtering circuit having a specifically designed band to cancel low frequency noise but still not limit temperature readings (e.g., sampling).

An SW filter may be a specifically modified filtering algorithm able to remove noise produced by 50/60 Hz power lines. Another part of SW filtering may be pseudo random jittering. This part may ensure that filtering will be very robust even in case when noise close to sampling frequency occurs. Random jittering may cancel a contribution from that kind of noise and ensure very accurate results which are completely cleaned up from all unwanted noise influences.

A combination of all the above mentioned items may result in a use of much longer sensor wires (and make an installation easier) than those used up to now. The present approach may have wires that exceed well beyond 5 m in an installation. Thus, the combination of the noted filtering approaches may be a feature of the present system.

To recap, a hydronic floor heating system with floor warming elements coupled to a floor, may incorporate a programmable thermostat controller with a display, a first sensor for generating a signal indicative of an external temperature, a second sensor for generating a signal indicative of an ambient temperature, and a processor connected to said first and second temperature sensors. The display may include a program schedule which allows a user to select one option when setting a low floor temperature limit.

The first sensor may be connected to thermostat terminals and a measuring circuit.

The measuring circuit may contain a capacitive low pass filter which filtrates interference at higher frequencies.

The selection may provide a Yes option to ignore low floor temperature limits during a set period and a No option to maintain the low floor temperature limit.

The programmable thermostat may include a program schedule for setting vacation mode by a single setpoint based on a control mode.

The first sensor may be wired to the programmable thermostat with (for example) a 100 meter (more or less) cable in combination with a hardware filtration.

The programmable thermostat may include software that contains a 300 Hz sampling process that ensures a filtering of 50 Hz and 60 Hz. The sampling rate may be more or less, for instance, between 100 and 1000 Hz. The filtering may be more or less than 50 Hz and 60 Hz.

The programmable thermostat may include software that contains a pseudo-random function which has a reading interval of one or more seconds in a spread interval at random times.

The spread interval may be at least +/−1/50 Hz.

The spread interval may be at least +/−20 ms.

A hydronic floor heating thermostat configured to control one or more components of an HVAC system, the thermostat may incorporate a controller, a plurality of temperature sensors, a display with buttons for selecting, and a controller configured to provide one or more control signals wherein the controller is configured to assist a user in setting a temperature limit within the thermostat by providing a decisive selection within the display for the user to select or allow one temperature limit to be set, and in response perform an action.

The decisive selection may need a Yes or No from a user.

Only an "Away" setpoint may be maintained based on a control mode.

The plurality of temperature sensors may measure at least external temperature and ambient temperature.

The thermostat may be connected to an external sensor using an extended cable of at least 5 m.

An approach of implementing pseudo-random jittering in a hydronic flooring system, the approach may incorporate receiving a plurality of individual readings from sensor data regarding an external temperature, and modifying a 300 Hz or more or less Hz reading principle to the plurality of individual readings.

An external temperature sensor measuring circuit may contain a capacitive low pass filter which filtrates interference at higher frequencies.

The individual readings may be randomly phase swept.

A phase uttering range may have an amplitude of at least +/−20 ms.

The individual reading period may be 1/300 Hz, or more or less.

Having thus described several illustrative versions of the present disclosure, those of skill in the art will readily appreciate that yet other versions may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method of implementing pseudo-random jittering in a hydronic flooring system, the method comprising:
   receiving, by a measuring circuit, a plurality of individual temperature readings from a temperature sensor;
   applying, by the measuring circuit, a 300 Hz reading principle to the plurality of individual temperature readings; and
   applying, by the measuring circuit, pseudo-random jittering to the plurality of individual temperature readings, wherein the pseudo-random jittering has a phase jittering range having an amplitude of at least +/−20 ms.

2. The method of claim 1, wherein the plurality of individual temperature readings are randomly phase swept.

3. The method of claim 1, wherein receiving the plurality of individual temperature readings includes receiving each individual temperature reading of the plurality over a respective reading period, wherein the respective period is 1/(300 Hz).

4. The method of claim 1, wherein receiving the plurality of individual temperature readings includes receiving each individual temperature reading of the plurality over a respective reading period, wherein the reading period is more or less than 1/(300 Hz).

5. The method of claim 1, further comprising filtering, by the measuring circuit and from the plurality of individual temperature readings, noise produced by 50 Hz and 60 Hz power lines.

6. A method of implementing pseudo-random jittering in a hydronic flooring system, the method comprising:
   receiving, by a measuring circuit, a plurality of individual temperature readings from a temperature sensor;
   applying, by the measuring circuit, a more or less than 300 Hz reading principle to the plurality of individual temperature readings; and
   filtering, by the measuring circuit and from the plurality of individual temperature readings, noise produced by 50 Hz and 60 Hz power lines.

7. The method of claim 6, further comprising applying, by the measuring circuit, pseudo-random jittering to the plurality of individual temperature readings.

8. The method of claim 6, wherein the plurality of individual temperature readings are randomly phase swept.

9. A system for implementing pseudo-random jittering in a hydronic flooring system, the system comprising:
   a sensor configured to sense an external temperature; and
   a measuring circuit configured to:
      receive a plurality of individual temperature readings from the sensor; and
      apply a 300 Hz reading principle to the plurality of individual temperature readings,
      wherein the measuring circuit is configured to filter, from the plurality of individual temperature readings, noise produced by 50 Hz and 60 Hz power lines.

10. The system of claim 9, wherein the measuring circuit comprises a capacitive low pass filter.

11. The system of claim 9, wherein the sensor is configured to randomly phase sweep the individual temperature readings of the plurality.

12. The system of claim 9, wherein the sensor is configured to apply pseudo-random jittering to the sensing of the external temperature.

13. The system of claim 12, wherein the pseudo-random jittering comprises a phase jittering range having an amplitude of at least +/−20 ms.

14. The system of claim 9, further comprising a thermostat comprising the sensor.

15. The system of claim 9, wherein each individual temperature reading of the plurality comprises a respective temperature reading over a respective reading period, wherein the reading period is more or less than 1/(300 Hz).

16. The system of claim 9, wherein each individual temperature reading of the plurality comprises a respective temperature reading over a respective reading period, wherein the reading period is 1/(300 Hz).

* * * * *